UNITED STATES PATENT OFFICE.

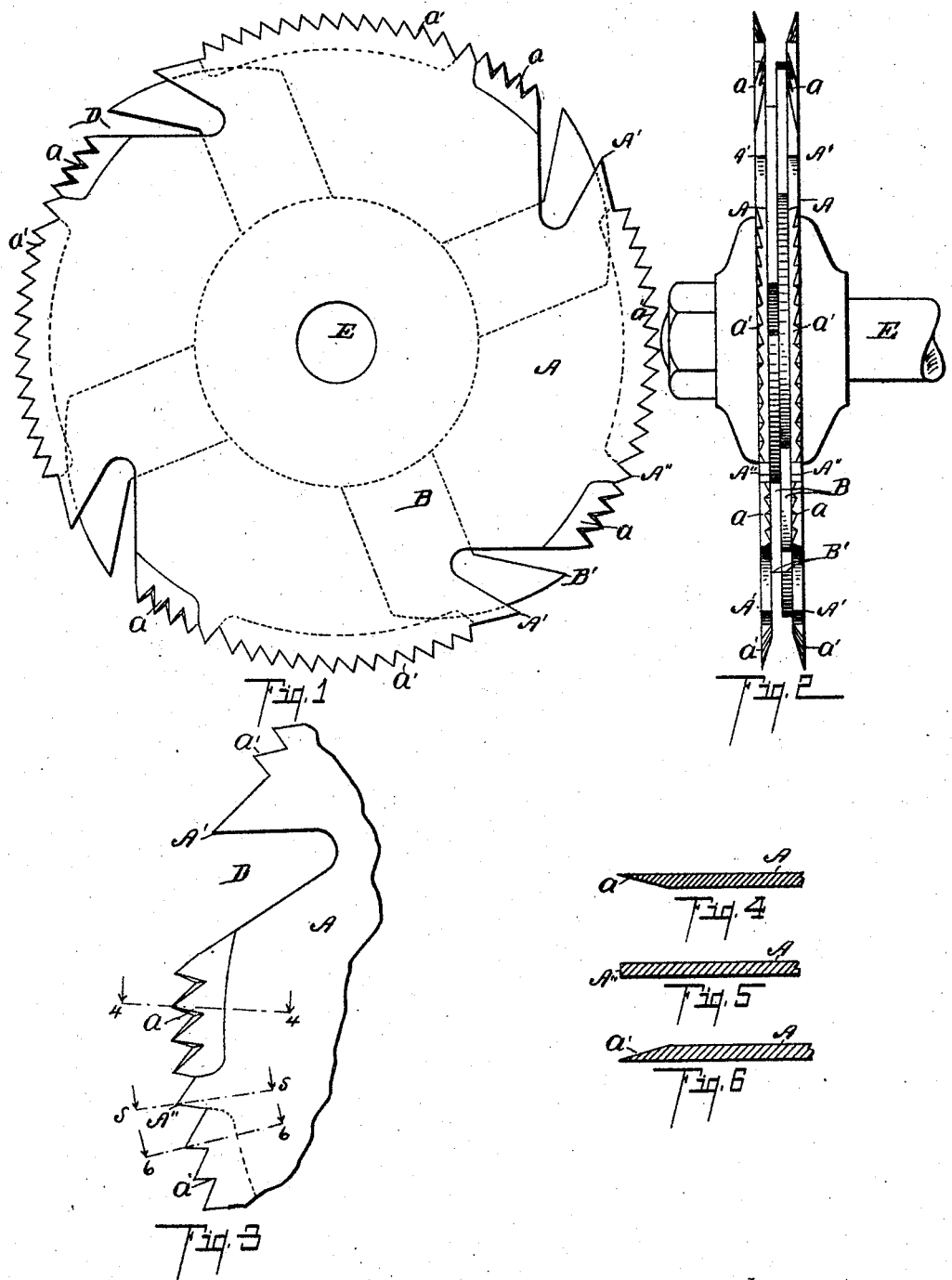

WILLIAM R. FOX, OF GRAND RAPIDS, MICHIGAN.

CUTTER-HEAD.

No. 800,143.  Specification of Letters Patent.  Patented Sept. 26, 1905.

Application filed March 6, 1905. Serial No. 248,594.

*To all whom it may concern:*

Be it known that I, WILLIAM R. FOX, a citizen of the United States, residing in the city of Grand Rapids, county of Kent, State of Michigan, have invented certain new and useful Improvements in Cutter-Heads, of which the following is a specification.

This invention relates to improvements in cutter-heads.

The objects of this invention are to provide an improved cutter-head which is simple and economical to manufacture and very effective and durable in use; to provide an improved cutter-head which may be readily and easily sharpened when dulled; to provide an improved cutter-head which can be operated with a relatively small expenditure of power.

Further objects and advantages of my invention will clearly appear from the detailed description to follow.

I accomplish the objects of my invention by the devices and means described in the following specification.

The invention is clearly defined, and pointed out in the claims.

A structure embodying the features of my invention is clearly illustrated in the accompanying drawings, forming a part of this specification, in which—

Figure 1 is a face view of my improved cutter-head, showing one of the two circular saws with two intermediate cutters interposed therebetween. Fig. 2 is a view of my improved cutter-head and shows the two circular saws and intermediate cutters between. Fig. 3 is an enlarged view of a detached portion of one of the circular saws forming part of the cutter-head. Figs. 4, 5, and 6 are detail vertical sectional views taken, respectively, along the lines 4 4, 5 5, and 6 6 of Fig. 3.

In the drawings the sectional views are taken looking in the direction of the little arrows at the ends of the section-lines, and similar letters of reference refer to similar parts throughout the several views.

A represents one of the symmetrical and opposite circular saws of the cutter-head, which is suitably mounted upon the arbor E. The teeth of each circular saw are arranged in groups, each group being separated by a relatively large clearance D and consisting of a large clearer-tooth A', having a top cutting edge of substantially the same width as the thickness of and perpendicular to the face of the saw, a long series of cutting-teeth a', a small clearer-tooth A'', having a top cutting edge of substantially the same width as the thickness of and perpendicular to the face of the saw, and a short series of cutting-teeth a. It will thus be observed that the clearer-teeth A' and A'' have chisel-like cutting edges.

The peripheral edge of the circular saw A, from which are formed the cutting-teeth a', is beveled on the inside to a thin knife-like edge toward the outside of the circular saw from the rear of the clearer-tooth A' to the front edge of the clearer-tooth A''. The peripheral edge of the circular saw A, from which are formed the cutting-teeth a, is beveled on the outside to a thin knife-like edge toward the inside from the rear of the clearer-tooth A'' to the clearance D.

The cutting-teeth a and a' are cross-cutting teeth having a slight pitch with their oblique faces toward the outside and the inside, respectively, of the circular saw, their cutting edges lying, respectively, in the planes of the inside and outside faces of the saw.

It will thus be apparent that my improved cutter-head may be made either with one group or a series of groups of teeth. Further, the clearer-tooth A'' may be formed at any point along the peripheral edge in any group. I prefer, however, a saw having four groups of teeth, one group in each quadrant, and the clearer-tooth A'' formed at a point much nearer the rear of its group, so that the number of cutting-teeth a and a' may be in the proportion of one to four in order to secure the best results in cutting effect and economy in power.

The intermediate cutter B, interposed between the circular saws, preferably consists of a bar with oppositely-extending teeth B' B', having chisel-like cutting edges of substantially the same width as the thickness of the intermediate cutter. The intermediate cutter may, however, be of any desirable form suitably adapted therefor and as many may be used as the width of cut requires.

If it is required to cut a narrow groove, two symmetrical and opposite circular saws may be used without intermediate cutters or two saws with a single intermediate cutter may be used, and for cutting a still wider groove two or more intermediate cutters may be interposed between the two circular saws, as shown at Figs. 1 and 2 of the drawings.

Having thus fully described my invention, what I claim as new, and desire to secure by Letters Patent, is—

1. In a rotary cutter-head, in combination, an arbor; a pair of symmetrical and opposite circular saws, having teeth arranged in groups, each group being separated by a relatively large clearance and consisting of a relatively large clearer-tooth having a chisel-like top cutting edge of substantially the same width as the thickness of the saw, a long series of cutting-teeth beveled on the inside of the saw and having their cutting edges in the plane of the outside face of the saw, a relatively small clearer-tooth having a chisel-like top cutting edge of substantially the same width as the thickness of the saw, a short series of cutting-teeth beveled on the outside of the saw and having their cutting edges in the plane of the inside face of the saw; and an intermediate cutter interposed between the two circular saws, substantially as described.

2. In a rotary cutter-head, in combination, an arbor; a pair of symmetrical and opposite circular saws, having teeth arranged in groups, each group being separated by a relatively large clearance and consisting of a relatively large clearer-tooth having a chisel-like top cutting edge of substantially the same width as the thickness of the saw, a long series of cutting-teeth beveled on the inside of the saw and having their cutting edges in the plane of the outside face of the saw, a relatively small clearer-tooth having a chisel-like top cutting edge of substantially the same width as the thickness of the saw, a short series of cutting-teeth beveled on the outside of the saw, and having their cutting edges in the plane of the inside face of the saw, substantially as described.

3. In a rotary cutter-head, in combination, an arbor; a pair of symmetrical and opposite circular saws, having teeth arranged in groups, each group being separated by a clearance and consisting of clearer-teeth, a series of cutting-teeth beveled on the inside of the saw and having their cutting edges in the plane of the outside face of the saw, a series of cutting-teeth beveled on the outside of the saw and having their cutting edges in the plane of the inside face of the saw; and an intermediate cutter interposed between the two circular saws, substantially as described.

4. In a rotary cutter-head, in combination, an arbor; a pair of opposite and symmetrical circular saws, having teeth arranged in groups, each group being separated by a clearance and consisting of clearer-teeth, a series of cutting-teeth beveled on the inside of the saw and having their cutting edges in the plane of the outside face of the saw, a series of cutting-teeth beveled on the outside of the saw and having their cutting edges in the plane of the inside face of the saw, substantially as described.

5. In a rotary cutter-head, in combination, an arbor; a pair of circular saws having teeth arranged in groups, each group being separated by a clearance and consisting of clearer-teeth and a series of cross-cutting teeth with a larger number of their cutting edges in the plane of the outside face of the saw than in the plane of the inside face of the saw; and an intermediate cutter interposed between the two circular saws, substantially as described.

6. In a rotary cutter-head, in combination, an arbor; a pair of circular saws having teeth arranged in groups, each group being separated by a clearance and consisting of clearer-teeth and a series of cross-cutting teeth with a larger number of their cutting edges in the plane of the outside face of the saw than in the plane of the inside face of the saw, substantially as described.

7. In a rotary cutter-head, in combination, an arbor; two circular saws, the outside face of each saw being provided with the majority of cross-cutting teeth; and an intermediate cutter interposed between the two circular saws, substantially as described.

8. In a rotary cutter-head, in combination, an arbor; and two circular saws, the outside face of each saw being provided with the majority of cross-cutting teeth, substantially as described.

9. In a rotary cutter-head, the herein-described circular saw having teeth arranged in groups, each group being separated by a large clearance and consisting of a relatively large clearer-tooth having a chisel-like top cutting edge of substantially the same width as the thickness of the saw, a long series of cutting-teeth beveled on the inside of the saw and having their cutting edges in the plane of the outside face of the saw, a relatively small clearer-tooth having a chisel-like top cutting edge of substantially the same width as the thickness of the saw, a short series of cutting-teeth beveled on the outside of the saw and having their cutting edges in the plane of the inside face of the saw, substantially as described.

10. In a rotary cutter-head, the herein-described circular saw having teeth arranged in groups, each group being separated by a clearance and consisting of clearer-teeth, a series of cutting-teeth beveled on the inside of the saw and having their cutting edges in the plane of the outside face of the saw, a series of cutting-teeth beveled on the outside face of the saw and having their cutting edges in the plane of the inside face of the saw, substantially as described.

11. In a rotary cutter-head, the herein-described circular saw having teeth arranged in groups, each group consisting of clearer-teeth, and cross-cutting teeth with a majority of their cutting edges in the plane of one of the faces of the saw, substantially as described.

In witness whereof I have hereunto set my hand and seal in presence of two witnesses.

WILLIAM R. FOX. [L. S.]

Witnesses:
ETTA McOMBER,
ETTA HELMKA.